(12) United States Patent
Kobialka

(10) Patent No.: US 7,172,495 B2
(45) Date of Patent: Feb. 6, 2007

(54) METHOD AND APPARATUS USING A SENSOR FOR FINISH-MACHINING TEETH

(75) Inventor: Claus Kobialka, Durach (AT)

(73) Assignee: Emag Holding GmbH, Salach (DE)

( * ) Notice: Subject to any disclaimer, the term of this patent is extended or adjusted under 35 U.S.C. 154(b) by 0 days.

(21) Appl. No.: 11/433,947

(22) Filed: May 15, 2006

(65) Prior Publication Data

US 2006/0264155 A1    Nov. 23, 2006

(30) Foreign Application Priority Data

May 23, 2005   (DE)   ...................... 10 2005 024 127

(51) Int. Cl.
*B24B 49/03* (2006.01)
(52) U.S. Cl. ................... 451/21; 451/8; 451/47
(58) Field of Classification Search .................. 451/21, 451/8, 5, 47
See application file for complete search history.

(56) References Cited

U.S. PATENT DOCUMENTS

| | | | | |
|---|---|---|---|---|
| 1,985,213 A | * | 12/1934 | Page | 451/47 |
| 2,069,324 A | * | 2/1937 | Miller | 451/180 |
| 4,848,040 A | * | 7/1989 | Nishino | 451/5 |
| 5,239,782 A | * | 8/1993 | Lorenz et al. | 451/5 |
| 5,347,760 A | * | 9/1994 | Miyauch et al. | 451/114 |
| 6,565,418 B1 | * | 5/2003 | Feisel | 451/10 |

FOREIGN PATENT DOCUMENTS

CA    2 124 270    11/1994

* cited by examiner

*Primary Examiner*—Robert A. Rose
(74) *Attorney, Agent, or Firm*—Andrew Wilford

(57) ABSTRACT

Teeth of a workpiece of a workpiece are finish-machined by first gauging shapes of the workpiece teeth and generating actual-value signals corresponding thereto. These actual-value signals are compared to set points representing desired tooth shapes, and the teeth of the workpiece are meshed with abrasive teeth of a honing tool and the tool and workpiece are relatively rotated while orienting them so as to remove material from workpiece teeth whose actual-value signals vary from the respective set points. The steps of gauging, comparing, and removing material are then repeated until the actual-value signals are substantially equal to the set points.

10 Claims, 2 Drawing Sheets

METHOD AND APPARATUS USING A SENSOR FOR FINISH-MACHINING TEETH

FIELD OF THE INVENTION

The present invention relates to a method and apparatus for finish machining. More particularly this invention concerns such a method and apparatus that use a sensor and that serve for burnishing or honing gear teeth.

BACKGROUND OF THE INVENTION

Canadian patent 2,124,270 describes a method of finish machining external gear teeth where an internally threaded tool shaped like a ring gear with abrasive-faced internal teeth is meshed with an externally toothed workpiece and both the tool and workpiece are then rotated about their respective axes, which typically run skewly at a small acute angle to each other, for material removal from the tool. Before the actual machining operation a gauging of the workpiece is effected by meshing the tool and workpiece and relatively rotating them while monitoring their angular positions so as to determine which teeth need more or less material removal. Then during the actual machining operation the readings taken during the gauging step are utilized to relatively angularly position and drive the tool and workpiece to achieve the desired end shape.

The honing tools are, as mentioned, basically shaped as ring gears with internal abrasive-coated teeth. Such a tool has a fairly limited service life because the abrasive wears off. Although when the tool is fresh it is possible to produce the desired profile in the workpiece very quickly, when the tool is badly worn the process takes much longer.

Thus in order to ensure that the workpieces are all fully machined, it is standard to provide for a machining time that allows even a badly worn tool to be effective. Thus, for example, the machining time is set for 20 sec per workpiece, and the tool is replaced when it is starting to wear so that no bad workpieces are produced. This on the one hand lengthens overall machining time, and on the other hand does not fully use the tools.

OBJECTS OF THE INVENTION

It is therefore an object of the present invention to provide an improved finish grinding method and apparatus.

Another object is the provision of such an improved finish grinding method and apparatus that overcomes the above-given disadvantages, in particular that is more efficient and accurate than the known systems.

SUMMARY OF THE INVENTION

Teeth of workpieces are finish-machined to a desired profile by first, in successive trial machining operations meshing the teeth of each of a first plurality of the workpieces with the abrasive teeth of a first honing tool in the machining station and relatively rotating the tool and workpieces while orienting them so as to remove material from the workpiece teeth. Then, after each of the trial machining operations, these workpieces are shifted to the gauging station and there shapes of the teeth of the first plurality of workpieces are measured or gauged and actual-value signals corresponding thereto are generated. These actual-value signals are compared with set points representing the desired profile and differences between the actual-value signals and the set points are used to generate a honing-tool wear profile so as to determine machining times to produce the desired profile from the honing tool as it wears during the successive machining operations. Thereafter in the machining station a second plurality of workpieces are machined with a second honing tool substantially identical to the first honing tool in accordance with the wear profile by machining the second plurality of workpieces with successively longer machining times so as to compensate for wear of the other honing tool.

The result of this invention in practice is that the machining operation is faster and uses the honing tools more effectively. For instance in the prior art it was estimated that after finishing 100 workpieces the machining time for a standard honing tool was 20 sec, and that after this amount for machining the tool worked so slowly as to be uneconomical. This the machining time per workpiece was set to 20 sec and the tool was swapped out after 100 workpieces. With the system of this invention it has been determined that the machining time with a fresh workpiece is as little as 5 sec, so that at the start of a cycle, that is a run using a single honing tool, the machining time is set to 5 sec, and then increased with each successive workpiece. The time saving is so great that the tool can be used to machine 150–200 workpieces in the same time or less time than was used by the prior art system to machine 100, with perfect results. The result is that either more work is done in less time or the same amount of work is done using fewer honing tools. Either way productivity increases substantially.

In practice this is done by establishing a wear profile by first gauging a workpiece at several times during a single machining operation. Thereafter more workpieces are machined and checked either during or at the ends of their machining cycles. This can be repeated with more than one honing tool to produce a very accurate wear profile that is then exploited to maximize productivity as described above.

According to the invention the steps are all carried out while securing the workpiece in the same holder. In addition the gauging and machining steps are carried out at respective gauging and machining stations that are offset from each other. The method further has according to the invention the step of transporting the workpiece between the stations before the machining step. More particularly the workpiece is picked from a loading station offset from the gauging and machining stations and displacing it into the gauging station, and is displaced from the machining station to an unloading station offset from the gauging and machining stations when completed. The loading and unloading stations are at substantially the same location.

The gauging is conducted in accordance with the invention by moving the workpiece relative to a stationary sensor, at a pitch circle of the teeth. This way the gauging determines tooth thickness.

The finish-machining apparatus of this invention therefore has a sensor for gauging shapes of the workpiece teeth and generating actual-value signals corresponding thereto and a honing tool having abrasive teeth. A workpiece holder is driven to mesh the teeth of the workpiece with the abrasive teeth of the honing tool and relatively rotate the tool and workpiece while orienting them so as to remove material from workpiece teeth whose actual-value signals vary from the respective set points. A controller compares the actual-value signals to set points representing desired tooth shapes and is connected to the drive for repeatedly gauging the shapes of the workpiece teeth and generating the wear profile that is used to run the honing machine.

The sensor is stationary and normally projects upward. The workpiece is normally rotated about a vertical axis. In addition the sensor has a plurality of sensor heads.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
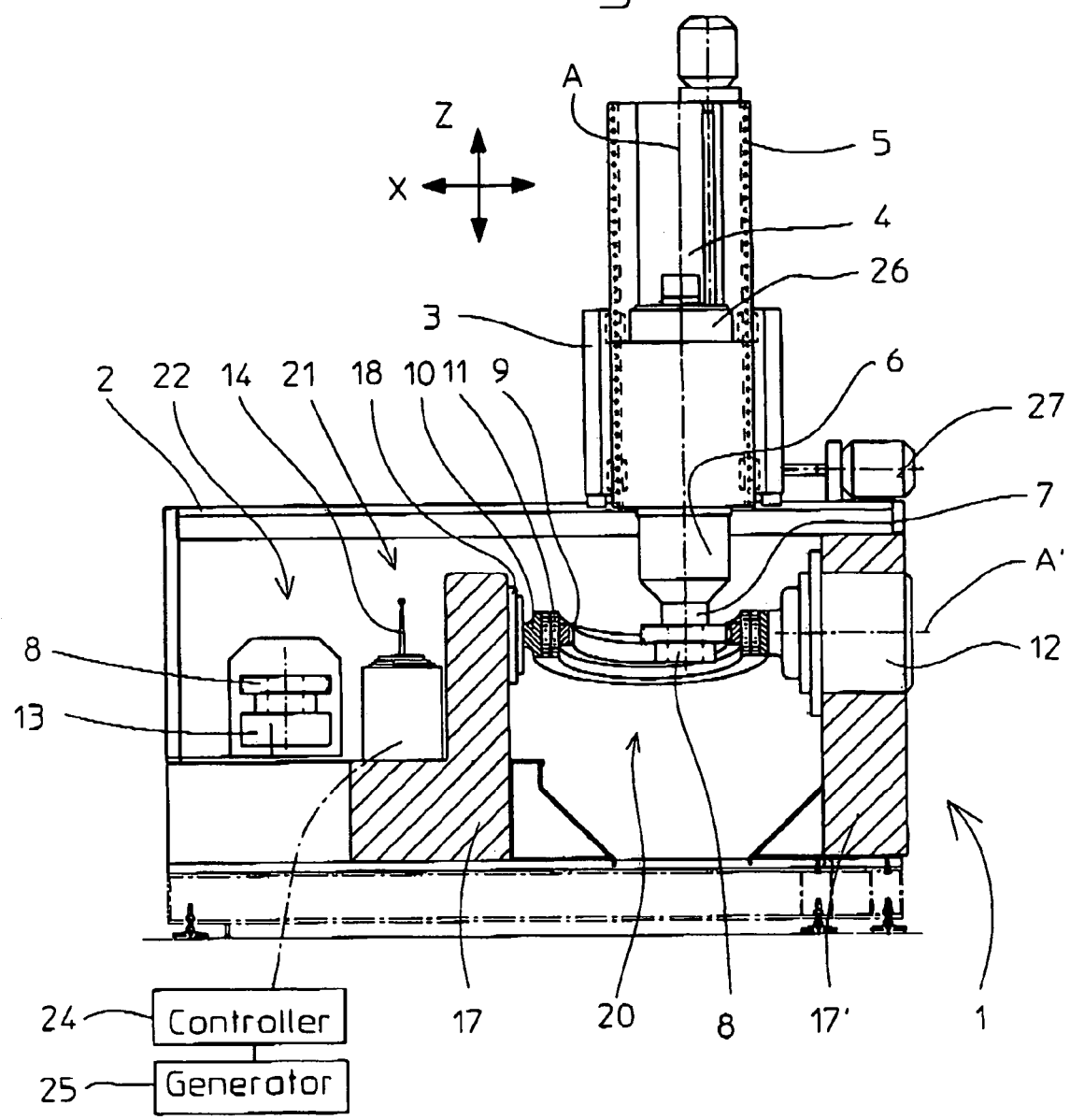
FIG. 1 is a partly schematic vertical section through the apparatus for carrying out the method of this invention.

As seen in FIG. 1 a gear-honing machine has a frame 1 with a pair of horizontally longitudinally extending beams 17 and 17' carrying a pair of horizontally transversely extending rails 2 on which a slide 3 can move in a transverse horizontal direction X. A slide 4 is vertically shiftable in a vertical direction Z perpendicular to the direction X on rails 5 carried on the slide 3 and in turn carries a spindle 6 supporting a chuck or holder 7 for rotating a workpiece 8, here a gear, about a vertical axis A. A schematically indicated hydraulic drive motor 26 serves for rotation of the tool 8 about the axis A, and an actuator 27 can shift the slide 3 in the direction X.

Figure 2:
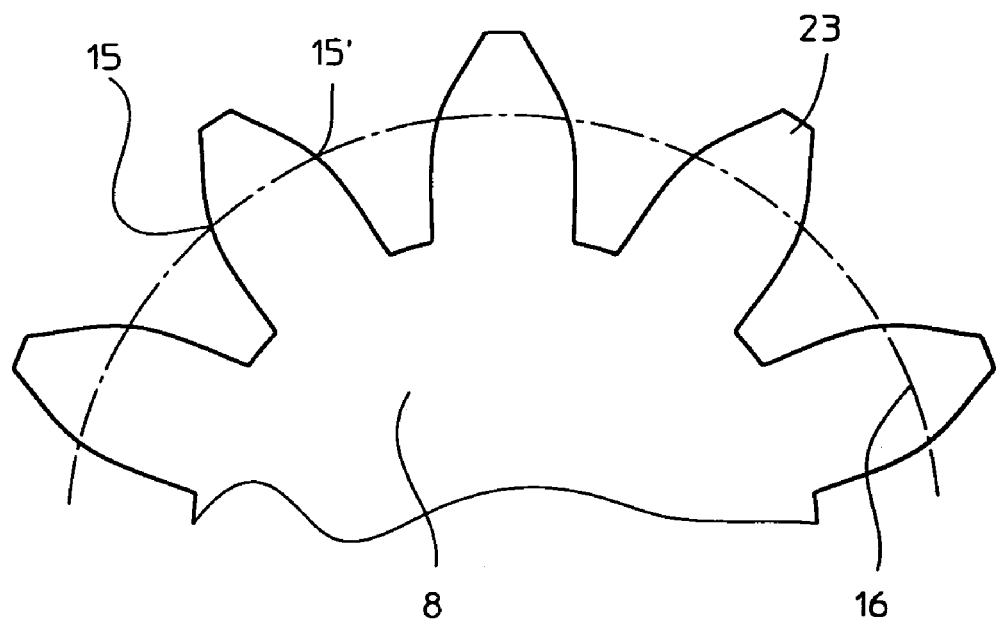
FIG. 2 is a large-scale end view of a workpiece.
Figure 3:
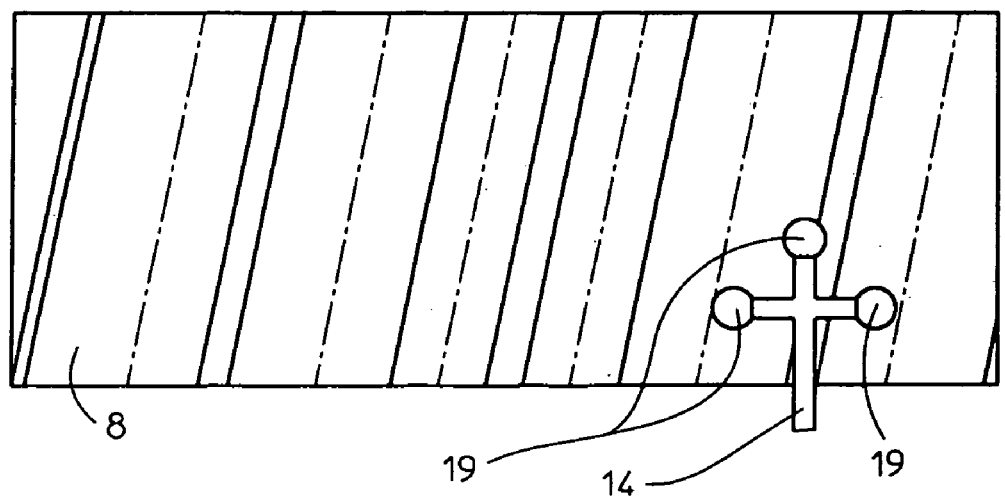
FIG. 3 is a top view of the workpiece and sensor together.

An annular honing tool or ring 9 that is internally toothed, as compared to the workpiece 8 (see FIG. 2) that is formed with external teeth 23 centered on a pitch circle 16, is mounted in a holder 10 for rotation about a vertical axis by a torque motor shown schematically at 11. A motor 12 can pivot a mount 18 of the support 10 and the tool 9 about a horizontal axis A', and the motors 11, 12, and 26 are operated by a controller 24. The axes A and A' are parallel to the directions Z and X, respectively.

The slide 3 can be shifted by the actuator 27, which is also operated by the controller 24, between a position in a machining station 20 above the tool 9, another position in a loading station 22 offset from the station 20, and a third intermediate position in a gauging station 21 between the end stations 20 and 21. An upstanding sensor 14 having three ball heads 10 is provided in the sensing station 21 and is connected to the controller 24. A conveyor 13 brings unfinished workpiece blanks into the station 22 and carries finished workpieces out of it.

Thus it is possible for the controller 24 to pick up a workpiece 8 in the loading station 22 and convey it to the gauging station 21 where it can move the workpiece 8 so as to engage the heads 19 against measurement points 15 and 15' on the teeth 23, generating a profile of the workpiece 8, as contact with the stationary sensor 14 is easily detected and compared with the position of the workpiece 8 as established by the motor 26 operated by the controller 24. The workpiece 8 is then moved into the machining station 20 and meshed with the abrasive teeth of the tool 9. The sensed profile is compared to an ideal profile received from a set-point generator 25 so that the various drives 26, 11, and 12 can be operated to machine the teeth 23.

I claim:

1. An apparatus for finish-machining teeth of workpieces to a desired profile, the apparatus comprising:
    a machine frame defining a machining station and a gauging station offset therefrom;
    an abrasive honing tool in the machining station;
    a workpiece holder displaceable between the stations and adapted to hold the workpieces;
    transport means connected to the workpiece holder for shifting the workpiece holder and a workpiece held thereby between the stations;
    drive means for moving the honing tool in the machining station when in mesh with a workpiece held by the holder in the machining station for removing material from the workpiece teeth; and
    gauging means including a sensor in the gauging station for gauging shapes of the teeth of a workpiece held by the holder in the gauging station.

2. The machining apparatus defined in claim 1 wherein the sensor is stationary.

3. The machining apparatus defined in claim 1 wherein the sensor projects upward and the workpiece is normally rotated about a vertical axis.

4. The machining apparatus defined in claim 3 wherein the sensor has a plurality of sensor heads.

5. A method of operating the apparatus of claim 1, the method comprising the steps of:
    a) in successive trial machining operations meshing the teeth of each of a first plurality of the workpieces with the abrasive teeth of a first honing tool in the machining station and relatively rotating the tool and workpieces while orienting them so as to remove material from the workpiece teeth;
    b) after each of the trial machining operations shifting the workpieces to a gauging station and there gauging shapes of the teeth of the first plurality of workpieces and generating actual-value signals corresponding thereto;
    c) comparing the actual-value signals with set points representing the desired profile and generating from differences between the actual-value signals and the set points a honing-tool wear profile so as to determine machining times to produce the desired profile from the honing tool as it wears during the successive machining operations; and
    d) thereafter in the machining station machining a second plurality of workpieces with a second honing tool substantially identical to the first honing tool in accordance with the wear profile by machining the second plurality of workpieces with successively longer machining times so as to compensate for wear of the other honing tool.

6. The machining method defined in claim 5 wherein steps a), b), and d) are all carried out while securing the workpiece in the holder.

7. The machining method defined in claim 5, further comprising the step before step a) of
    picking up the workpieces from a loading station offset from the gauging and machining stations and displacing it into the gauging station.

8. The machining method defined in claim 5 wherein the gauging is conducted by moving the workpiece relative to a stationary sensor.

9. The machining method defined in claim 5 wherein step b) is conducted at a pitch circle of the teeth.

10. The machining method defined in claim 5 wherein step b) determines tooth thickness.

* * * * *

UNITED STATES PATENT AND TRADEMARK OFFICE
CERTIFICATE OF CORRECTION

PATENT NO. : 7,172,495 B2 Page 1 of 1
APPLICATION NO. : 11/433947
DATED : February 6, 2007
INVENTOR(S) : Claus Kobialka It is certified that error appears in the above-identified patent and that said Letters Patent is hereby corrected as shown below:

Title Page, Item (75) Inventors:
Should Read, -- Claus KOBIALKA, Durach (DE) --

Signed and Sealed this

Third Day of April, 2007

JON W. DUDAS
*Director of the United States Patent and Trademark Office*